March 13, 1973  K. L. WINQUIST ET AL  3,720,403
FUEL-INJECTION CARBURETORS HAVING FUEL REGULATOR
Filed Feb. 5, 1969                                      8 Sheets-Sheet 5

United States Patent Office 3,720,403
Patented Mar. 13, 1973

3,720,403
FUEL-INJECTION CARBURETORS HAVING FUEL REGULATOR
Knut Ludvig Winquist and Sture Anders Backman, Orebro, Sweden, assignors to Johan H. Graffman, Villa Solimar, Benicasim, Castellon, Spain
Continuation-in-part of application Ser. No. 615,994, Feb. 14, 1967. This application Feb. 5, 1969, Ser. No. 796,877
Claims priority, application Sweden, July 3, 1968, 9,179/68
Int. Cl. F02m 9/08
U.S. Cl. 261—50 A    32 Claims

ABSTRACT OF THE DISCLOSURE

A fuel-injection type carburetor having a fuel injection valve arranged to open relative to the fuel inlet nozzle to a varying extent as a function of the rate of air flow through the carburetor and including flexible guide means for maintaining the valve aligned with the nozzle while permitting it to reciprocate relative thereto.

---

This application is a continuation-in-part of application, Ser. No. 615,994, filed on Feb. 14, 1967, now abandoned.

The present invention relates to fuel-injection type carburetors wherein the fuel injection nozzle is regulated by a yieldably biased valve. In such carburetors the valve is resiliently biased against the valve seat in a direction opposite to that of fuel flow, the fuel being supplied to the nozzle under a pulsating pressure whereby the valve is made to vibrate in accordance with the frequency of fuel pulsations. Such a carburetor will hereafter be referred to as a vibro-carburetor.

An advantage of this type of carburetor is that it may be positioned in the fuel inlet duct at a considerable distance from the inlet ports of the individual cylinders and in a manifold which is common to a plurality of such cylinders. This is in contrast to known injectors which feed into the inlet duct at a point immediately preceding the cylinder inlet.

Relative to conventional spray type carburetors and also relative to fuel injectors the vibro-carburetor provides a higher degree of fuel atomization and a more efficient mixing of fuel and air thereby resulting in more efficient combustion and cleaner exhaust gases. Specifically, the exhaust gases contain less carbon monoxide and less non-combusted hydrocarbons. In order to realize similar results in engines which employ injectors, a relatively complex control device is required to control the opening sequence of the injectors and the fuel supply to the individual injectors as a function of the absolute pressure in the cylinder inlet duct and as a function of the engine r.p.m.

The aforementioned vibro-carburetor includes a control device whereby the tension in the spring means for the fuel nozzle valve is regulated as a function of the throttle position so that the rate of fuel flow constantly corresponds to the throttle position. This type of control, however, is not at all instances adequate. For example, when engine torque output rises rapidly (as when a vehicle ascends a hill) the engine r.p.m. decreases to a corresponding degree as does the engine suction in the inlet manifold. In this instance, if the throttle setting remains unchanged the fuel air mixture will be too rich with consequent low combustion efficiency and the exhaust gases containing a high percentage of unburnt compounds.

It is an object of this invention to resolve the aforementioned problem relative to vibro-carburetors and, specifically, to provide therefor a means for controlling the fuel flow as a function of the flow of combustion air. This object is realized through the present invention which is directed to a regulator comprising a sensing means positioned in the air path and responsive to variations in the air flow in order to regulate the tension in the spring which acts upon the fuel nozzle valve.

A detailed description of the invention follows with reference to the accompanying drawings wherein.

Figure 1:
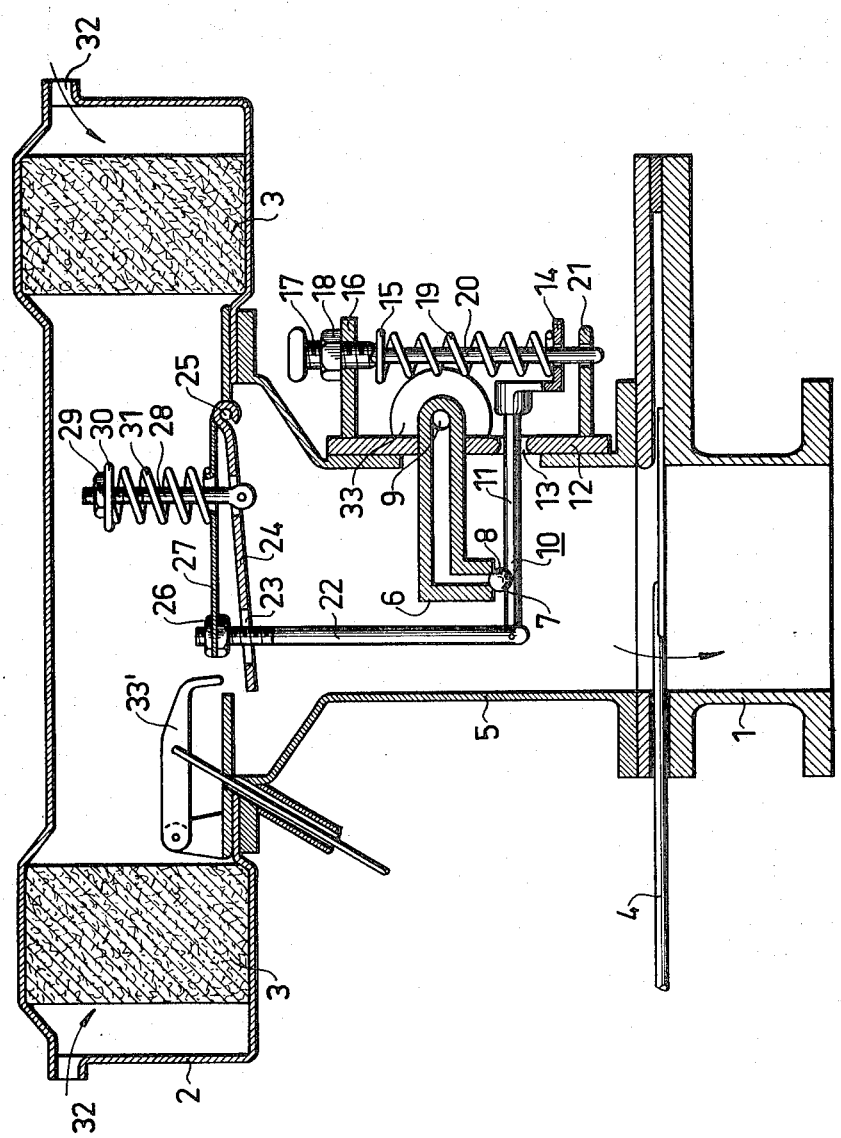
FIGS. 1 to 5 are sectional views of five different embodiments of regulators according to the invention, as applied to vibro-carburetors.

Shown in FIGS. 1 to 5 are different embodiments of a regulator according to the invention, arranged in a vibro-carburetor, the corresponding parts of which have been identified with the same reference characters in different figures. The introductory description of the carburetor itself applies to all five embodiments.

Figure 2:
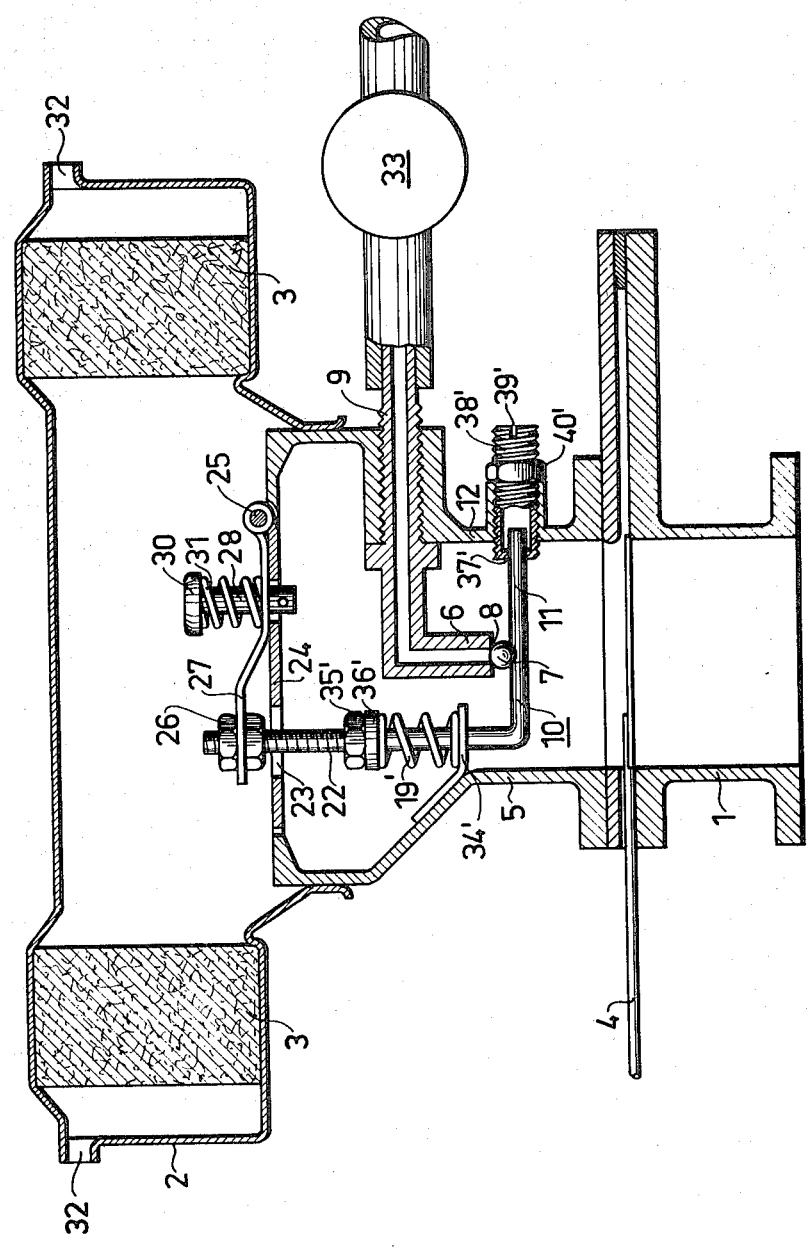
Figure 3:
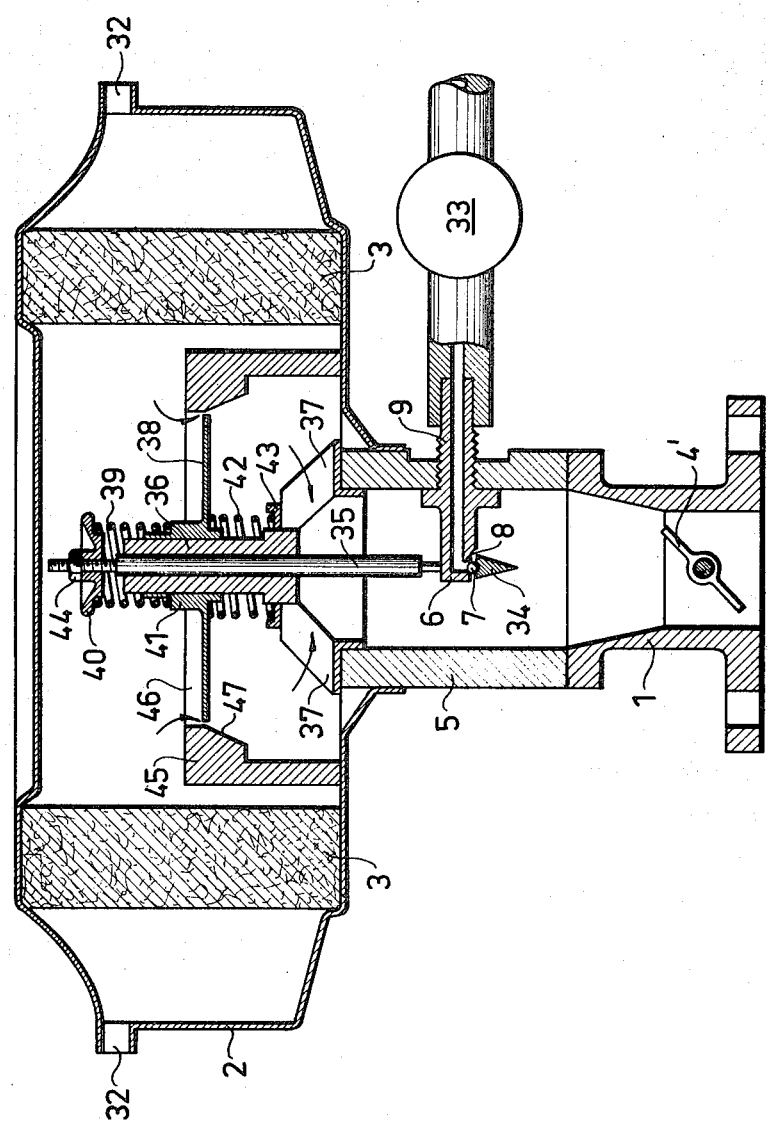
Figure 4:
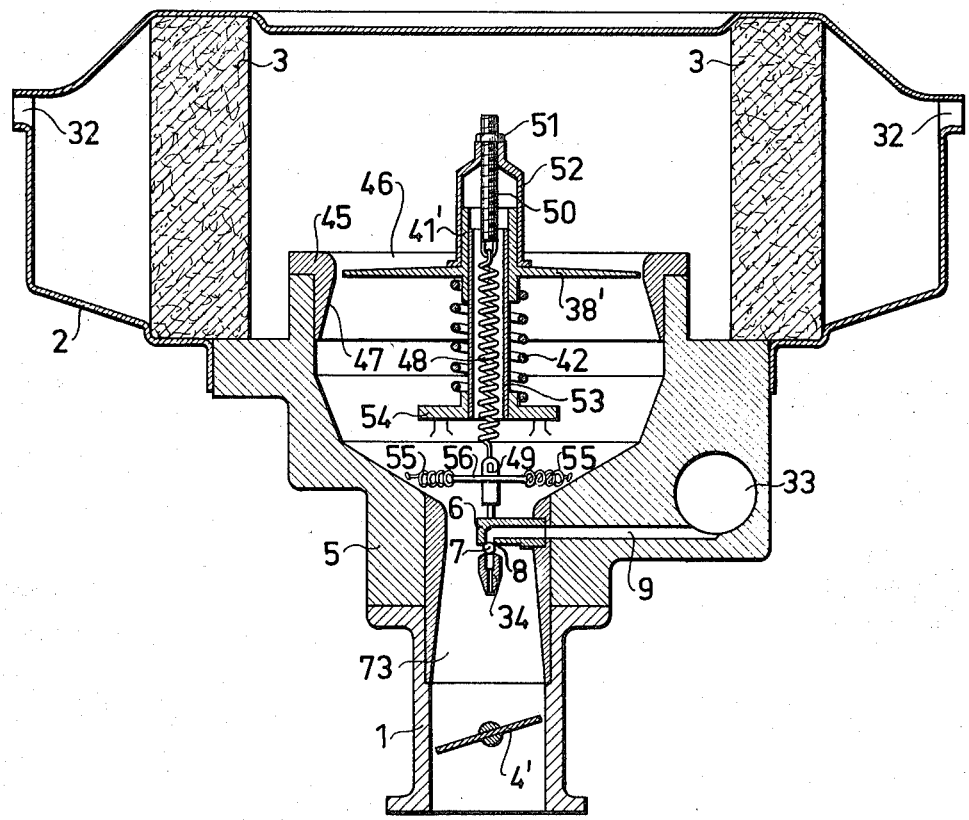
Figure 5:
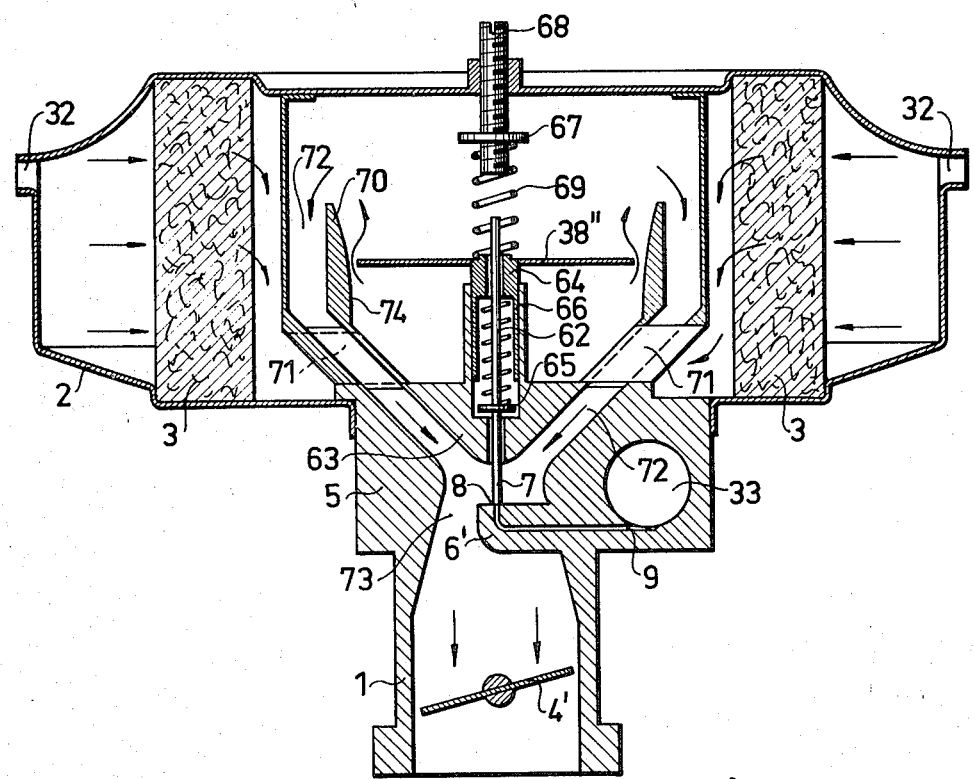

In FIGS. 1 to 5 the numeral 1 indicates an inlet pipe leading to an internal combustion engine. Connected to the upper end of the pipe is an air purifier 2 provided with filter 3, and the lower end of the inlet pipe is adapted to be connected to the inlet port or ports of one or more cylinders. The inlet pipe forms above the throttle 4, which in FIGS. 1–2 is a sliding throttle valve and in FIGS. 3–5 is a pivoted throttle valve, a carburetor housing 5, into which discharges a fuel injection nozzle 6. The injection nozzle is provided with a valve, which comprises, for instance, a ball-shaped valve body 7 and a valve seat 8. Fuel is supplied through a conduit 9 under pulsating pressure applied to the fuel by a pulse generator 33. The pulsating fuel pressure causes the valve body 7, which is spring biased against its seat, to vibrate and provides a disintegrating effect on the fuel flowing out of nozzle 6. This arrangement provides for an extremely high degree of atomization and extraordinarily good mixing with the air. A more detailed account hereof is given in the U.S. patent application, Ser. No. 536,550 filed by the same inventors on Mar. 7, 1966, now Pat. No. 3,510,112.

In the embodiment shown in FIG. 1 the valve body 7 is held in yielding abutment with the valve seat by means of an L-shaped valve lever arm 10, which in this embodiment is pivoted at its knee. The leg 11 supporting the valve body extends out through the wall 12 of the carburetor housing, where it is journalled in an opening 13, outside of which there is mounted on leg 11 a downwardly displaced plate 14. A helical spring 19 has one end thereof bearing against plate 14 and its other end bearing against plate 15, the tension in said spring being adjustable through turning of screw member 17 which is threadedly received in fixed support 16 and releasably locked therein by lock nut 18. Guide rod 20 extends axially through spring 19 and freely through aligned holes in plate 14 and in lower fixed support 21. Variation in the spring tension results in a corresponding variation of the force with which valve 7 is urged against seat 8.

The other leg 22 of the lever arm 10 passes through an opening 23 in a flap 24, which is capable of pivoting about a hinge 25, and said leg 22 is secured by two nuts 26 to a lever 27 which is capable of pivoting about the said hinge 25. The flap 24 and lever 27 are yieldingly connected together by means of a rod 28 which is pivotally connected to the flap 24. The rod 28 passes freely through the lever 27 and is provided at its free end with an abutment 30 fixed by means of a nut 29. Located between the abutment 30 and lever 27 is a helical pressure spring 31.

The regulator illustrated in FIG. 1 functions in the following manner. The throttle 4 is opened to a certain extent, whereupon the engine draws in air. The air flows in the direction of the arrows through the intake ports 32 of the air purifier and with its dynamic pressure actuates the flap 24, which opens (pivots downwardly) to a corresponding degree, whereupon the valve lever arm 10 is urged downwardly, via the rod 28, the spring 31 and the lever 27 in opposition to the force with which the valve 7 is held against the valve seat 8 by valve spring 19. The difference between the forces exerted upon member 10 by springs 31 and 19 constitutes a mean force which urges valve 7 to a closed position, this mean force varying in dependence upon the pivot position of flap 24. Valve 7 will open relative to orifice 8 because the fuel pressure in nozzle 6 will at least periodically be high enough to provide a net force in the open direction upon the valve 7. When valve 7 is moved away from orifice 8, nozzle 6 ejects an amount of fuel which is atomized, mixed with air and passed beyond the throttle valve into the cylinders. The valve spring 19, therefore, transmits a basic closing force to the valve 7, the net magnitude of which is then modified by the superimposed variable tension of spring 31, which is stretched when the flap 24 is actuated by the dynamic pressure of the air flow.

The reason for which the spring 31 has been arranged between the flap 24 and the valve lever 10 instead of connecting the flap 24 directly to the lever 10 is to obtain an improved regulating characteristic. According to the herein disclosed arrangement, the fuel shall be regulated according to an essentially linear function of the air flow, while a flap 24 which is fixed to the lever 10 and will not thereby yield to give a constant flow gap, actuates the valve lever in accordance with a quadratic function of the air flow. The described regulator, however, provides for an approximate linear function of the air flow.

To enable fuel to be injected without appreciable suction effect, e.g., in the case of starts under exceptional conditions, there is arranged a member 33' which corresponds to the choke on a spray carburetor.

The embodiment illustrated in FIG. 2 (which is shown with the throttle valve fully closed) differs from the embodiment previously described in that the valve spring and the whole of the valve lever arm are arranged within the carburetor housing. The valve spring 19' is arranged about the leg 22 between a fixed abutment 34' and an abutment 36' secured to the leg 22 by means of a nut 35', the lever arm being mounted in a center hole 37' in one end wall of an externally threaded tube 38', screwed into a threaded hole in wall 12. The tube is provided with a screw driver slot 39' and lock nut 40' for varying the bearing point of the leg 11 and, therefore, also its length. Thus, in this instance, the basic setting of the valve is effected by changing the length of the leg 11 instead of by changing the tension in spring 19' as in the embodiment shown in FIG. 1.

The regulator has been improved still further in the embodiments shows in FIGS. 3–4. Among other things, is is desired to obtain improved regulation of the air itself passing the sensing means at a certain degree of movement thereof, inter alia, in order to adjust the carburetor for different engines. Furthermore, attempts have been made to eliminate all setting means situated outside the carburetor housing and to enable the whole arrangement to be mountable and accessible from without when the air purifier is removed. A problem which is solved hereby is one which calls for the provision of the valve 7 with a proper guide structure so that it is unable to fall askew or jump out of alignment with the valve seat.

Figure 10:
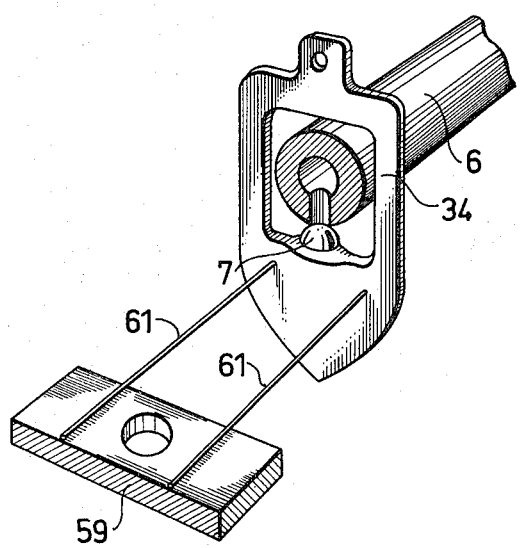
FIGS. 10 and 11 are perspective views, partly in section, of two different guide means for the valve body in the embodiment illustrated in FIG. 4.

In the embodiment shown in FIG. 3, the valve 7 is positioned in a stirrup-like member 34 which encircles the fuel nozzle 6 (see also FIG. 10). The upper portion of the stirrup is fixed to a valve rod 35 which is axially displaceably mounted in a sleeve 36 securely mounted on the carburetor housing 5 concentrically therewith by means of circumferentially spaced apart spokes 37 which permit air to flow down into the carburetor housing, as shown by the arrows in FIG. 3. A sensing means in the form of a rigid plate 38 is axially slidably mounted on the outside of sleeve 36 and is reciprocably movable in the same direction as the valve rod 35. A first helical type pressure spring 39 is arranged between a plate 40 which forms an abutment on the valve rod 35 and the hub 41 of the plate 38, said spring urging the valve rod 35 in an upwards direction. A second helical type pressure spring 42 is arranged between the hub 41 of the plate 38 and a bowl-shaped collar 43 of the sleeve 36, this second spring urging the plate 38 upwards. The abutment 40 can be adjusted by means of a nut 44.

Figure 9:
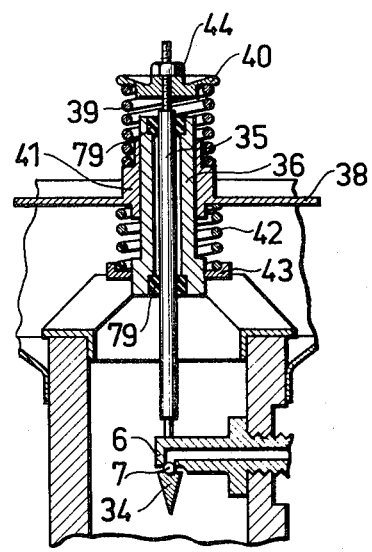
FIG. 9 shows in vertical section a guide structure for the valve body applied to the embodiment illustrated in FIG. 3.

A vertical wall 45 extends upwardly into the air purifier housing 2 and circumscribes an opening 46. The outer periphery of plate 38 forms an annular opening with the inner periphery of wall 45 through which the air must pass in order to enter the carburetor housing. The inner periphery 47 is so formed that the annular opening is essentially closed when the plate 38 occupies its upper position on the sleeve 36 but becomes progressively larger the further down the sleeve the plate is situated. In this instance, the opening and the plate are circular in horizontal view. In order to keep the friction in the guide structure as low as possible the sleeve 36 is preferably lined with polytetrafluoroethylene or, as in FIG. 9, provided with bushings 79 made of the same material.

The regulator illustrated in FIG. 3 functions in the following manner. The spring 39 actuates the valve rod 35 and thereby the valve 7 in a direction upwards towards the valve seat 8 to closed position. On the other hand, the pulsating flow of fuel from the pulse generator 33 urges the valve 7 and the valve rod 35 downwards in the opposite direction. Consequently, the extent to which the valve can open at a given fuel pressure depends upon the tension of spring 39 which in turn depends upon the axial position of the plate 38.

The spring 42 actuates the plate 38 upwards towards closed position in the opening 46. The plate 38, however, is moved downwards under the influence of the dynamic pressure of the combustion air, the pressure acting on the upper surface of the plate. The amount by which the plate is moved down is in a certain relationship with the air flow, which in its turn depends upon the r.p.m. of the engine and the position of the throttle. The fuel flow will, therefore, be constant at a given fuel pressure, a given r.p.m. and a given throttle setting. (By given fuel pressure is, of course, meant a given mean pressure, since the fuel pulsates; similarly, the micro-structure of the fuel flow presents a disintegrated and atomized course as opposed to its macro-structure which presents a constant course.) If the power output from the engine is increased, whereupon the requisite flow of combustion air through opening 46 increases, the plate 38 is moved down under the influence of the increased dynamic pressure. This movement of plate 38 increases the tension in spring 42 but reduces the tension in spring 39 whereby the maximum stroke (amplitude) of valve 7 increases for a given fuel pressure and therewith the fuel flow. Correspondingly, a decrease of the power output from the engine makes the spring 42 move the plate 38 upwards, the spring 39 thereby transferring an increased force to the valve body 7 whereby the fuel flow decreases. Consequently, the air flow moving down in the venturi 73 (shown only in FIGS. 4–5) of the carburetor will always be mixed there with a suitably adapted amount of fuel.

As will be evident from the foregoing, there is created a highly sensitive correlation between air flow and fuel flow, since the valve, figuratively speaking, hovers at a level determined by the air flow. It is obvious that the fuel valve will respond immediately to even small variations in the air flow, simply because the plate 38, which is affected by variations in the air flow, also directly actuates the fuel valve.

The embodiment illustrated in FIG. 4 differs from the embodiment shown in FIG. 3 in that the pressure spring 39 is in this instance replaced by a tension or draw spring 48 which is positioned between a stem member 49 supporting the valve 7 and a screw 50. The screw 50 is in threaded engagement with a setting nut 51 which abuts the end of a tube 52 secured to the hub 41' of the plate 38'. In this embodiment the hub 41' is mounted on a sleeve 53 which freely surrounds the screw 50 and the tension spring 48. The compression spring 42 in this instance is mounted between the plate 38' and a fixed abutment 54.

It is seen that in each of the embodiment of FIGS. 1 to 5 the respective regulating means for preadjustment of the mean force which acts upon the valve 7 is easily accessible in order to permit such regulation to be effected while the carburetor is in operation and while the engine served by the carburetor is running and without interrupting such operation. In FIG. 1, for example, spring 19 is adjustable from externally of the carburetor as also is the length of arm 11 in FIG. 2. The same applies to the adjusting of spring 69 by means 68 in FIG. 5. In FIGS. 3 and 4, it is a very simple matter to remove the air filter casing from the carburetor in order to provide access to adjusting means 40 and 51, this in no way disturbing the running of the engine or the operation of the carburetor.

In FIGS. 1 to 4 the adjustment is made upon spring members (19, 19', 39, 48) which act directly upon the valve stem or other valve carrying member, while in FIG. 5 the adjustment is made upon spring 69 which acts upon flap 38''. The net result, however, is the same since an adjustment on spring 69 changes the net force acting upon valve 7.

Figure 6:
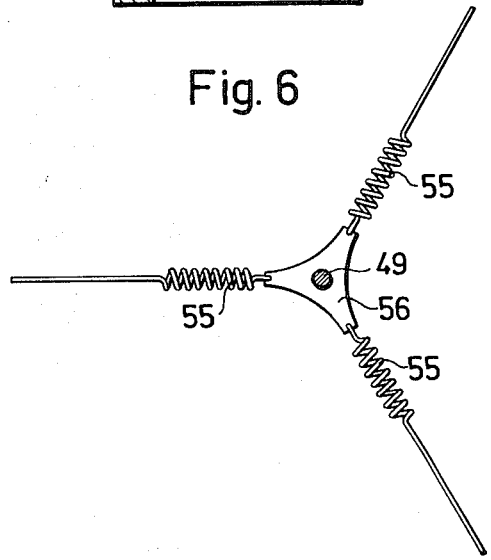
FIG. 6 is a plan view of a control device for the valve body of the carburetor, and applied to the embodiment illustrated in FIG. 4.
Figure 7:
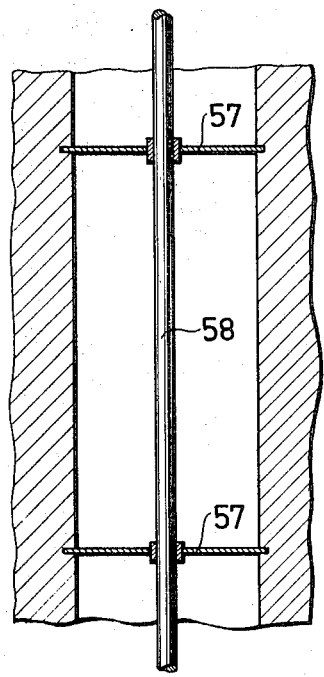
FIGS. 7 and 8 are respective vertical and horizontal views of another valve body control device.
Figure 8:
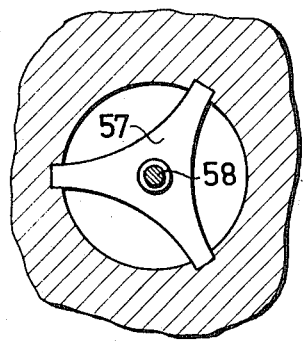
Figure 11:
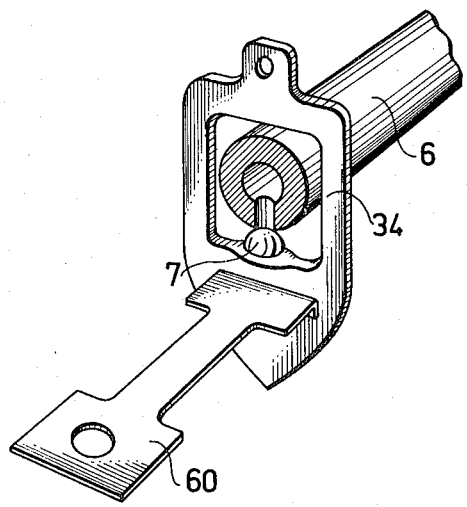

For the purpose of guiding the valve 7 there is arranged a three-armed spring guide device (FIG. 6) having three tension or draw springs 55 which are mounted between the wall of the carburetor housing and a plate 56 connected with the valve support member 49. The valve guide member may have various designs, e.g., as in FIGS. 7 and 8, in which the member comprises two three-armed spring guide devices 57 in the form of flexible blade springs formed in one piece and mounted between the carburetor housing and a valve body support member 58. FIGS. 10 and 11 show two different guide devices 59 and 60 arranged in a substantially horizontal plane, perpendicular to the direction of movement of the valve 7 secured on one side to the carburetor housing and on the other side to the stirrup 34. The guide device 59 shown in FIG. 10 is formed of two relatively rigid wires 61 which may, of course, be arranged to cross horizontally or form a cross-linked bend pivot in the vertical plane. The guide device shown in FIG. 11 comprises a plate. This guide device, which may be made, for instance, of spring steel, is chiefly yielding in the vertical plane so that valve vibrations are permitted but movements in the horizontal plane are prevented.

The importance of the type of guide means shown in FIGS. 6 to 11 is very great since said guide means constitute a solution to a very difficult problem which has heretofore been present in vibro-carburetors, namely: the problem of maintaining the valve 7 properly aligned with the orifice 8 despite the high frequency of vibration of said valve. The use of conventional bushings, etc., is not totally satisfactory since the vibrations in the device result in jamming of the valve stem. On the other hand, the guide means of FIGS. 6 to 11 obviate the existence of any sliding relative movement between parts (as a stem sliding within a bushing). Lateral guiding is provided as well as freedom of axial movement without relative movement between parts in the guide means of FIGS. 6 to 11. It is seen, of course, that in FIGS. 6 and 7 the valve stem is fixedly attached to members 56 and 57, respectively, at the point where the stem passes through the plate members. Analogously, in FIGS. 10 and 11 the stem part 34 is fixedly attached to the ends of wires 61 and blade spring 60.

The embodiment shown in FIG. 4 functions in the same manner as the embodiment described with reference to FIG. 3, the tension spring 48 being inversely mounted with regard to the compression spring 39 and hence the action is the same.

FIG. 5 shows the application of the regulator in an inverted injection nozzle 6'. In this case, the plate 38'' forming the sensing means is adapted to be actuated from beneath by the inflowing combustion air. The valve 7 is carried by a rod 62 which is axially displaceably mounted in a sleeve 63, attached to the carburetor housing, and in the hub 64 of the plate 38''', and is provided with a stationary abutment 65. Mounted between the abutment and the hub 64 is a first pressure spring 66. The hub 64 is, in turn, mounted in the sleeve 63. Between the hub 64 and a fixed but adjustable abutment 67, arranged on a screw screwed into the roof of the air purifier, is a second pressure spring 69 on the downstream side of the plate 38'''. The plate is surrounded by a wall 70, between which wall and the plate is formed an annular through-flow slot of variable width, for the combustion air.

The combustion air flows, in the direction of the arrows in FIG. 5, in through the filter 3 and in through radial passages 71, and presses against the plate 38''' from beneath, against the action of spring 69, so that the tension of spring 66 decreases and the amplitude of the valve for a given fuel pressure is allowed to increase, whereupon the flow of fuel also increases. When the air has passed the plate 38''' it flows down through an annular passage 72 to the venturi 73 of the carburetor where it is mixed with the fuel in an atomized state, whereupon the fuel-air mixture flows past the throttle 4 to the inlet port of the separate cylinders into which it is drawn.

The inside 74 of the wall 70 defining the through-flow slot has been given, similarly to the inside 47 in FIGS. 3 and 4, such design that a suitable flow of air is permitted to pass at any position of the sensing means. This design, together with the characteristics and tension of the springs, determines the regulating characteristics of the regulator. The total spring tension can be set by means of the screw 68.

Instead of being adapted for actuation in an upward direction from the injection nozzle, the sensing means may, of course, as in the case of the inverted nozzle, be arranged so that air flows from above towards the same. In such a case the movement must be transmitted to the first pressure spring by means of a lever arrangement.

Figure 12:
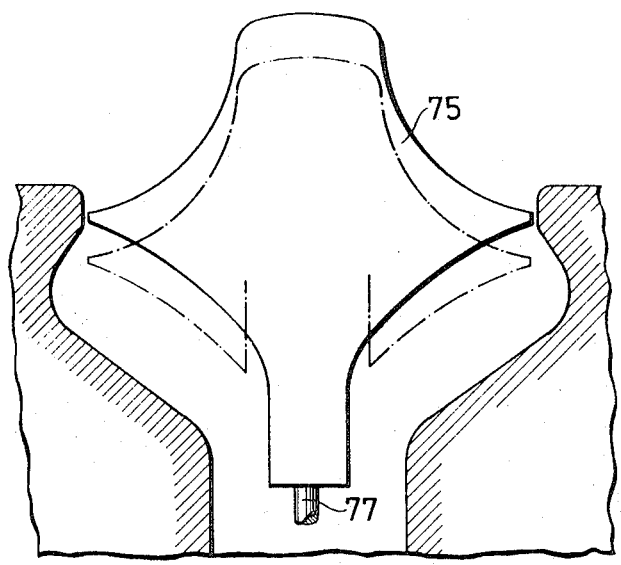
FIGS. 12 and 13 are vertical views of two different embodiments of a sensing means which forms part of the regulator.
Figure 13:
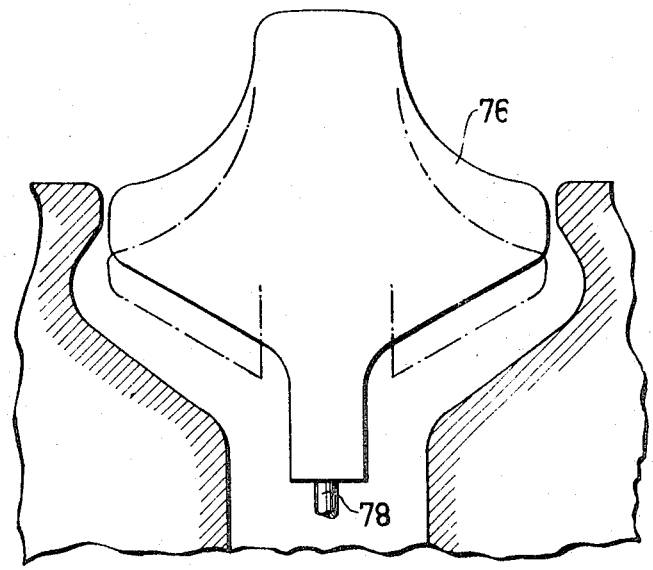

In the embodiment illustrated in FIGS. 3 to 5, the sensing means has the form of a flat plate, but it may have a shape of flow, e.g., as a solid of revolution, the generatrix of which is so shaped that the solid in cooperation with the surrounding walls to each flow of combustion air adjusted to the present fuel flow gives an optimum combination of sensitivity to the dynamic pressure of the air and the flow losses in the slot between the sensing means and the surrounding wall. Also, the flow pattern in other respects may in this manner be modified with regard to the mixing effect, etc. Sensing means thus formed are shown in FIGS. 12 and 13, respectively, in which sensing means 75 and 76, respectively, are shown in rest position in full lines and in an air actuated position in dot-dash lines. In this instance, the sensing means is in the form of a flow body, molded in plastic, for instance. Only a portion of the body shown with full lines is conceived to form the movable sensing means, which via springs enclosed in the body is connected with the lower portion 77 and 78, respectively, supporting the valve. The sensing means may also be provided with a means for inducing a turbulent air flow in the cylinder to obtain thereby a more effective mixing effect with the fuel.

Naturally, the stirrup member 34 is not restricted to an S-stirrup-like design, but can also be designed essentially L-shaped, for instance.

It is possible when using the regulator according to the invention to avoid completely direct connection between the valve spring and the throttle setting device. Thus, a fuel supply is obtained which almost completely constitutes a linear function of the air flow under varying operating conditions, such as when the r.p.m. decreases with increased torque, whereupon the amount of air sucked in decreases. In this instance, the stroke of the sensing means shortens immediately, and the abutment force of the valve body increases, whereby the mixture relationship is maintained. A constant problem when retarding is the delay in the reduction of flow when the accelerator (gas pedal) is released, resulting in a too rich mixture and dirtier exhaust fumes. In the case of the present invention, however, the fuel flow decreases immediately the air supply is throttled, and excellent correlation is obtained between changes in the air flow and in the fuel flow. The present invention provides an excellent complement to the vibro-carburetor described in the aforementioned patent specifications.

The details given herein with reference to preferred embodiments are not intended to be limitative of the scope of applicability of the disclosed inventive concepts but rather are only illustrative thereof, it being intended that the invention be susceptible to various modifications, alternatives, substitutions, etc., which are obvious or well within the purview of one skilled in the art.

What is claimed is:

1. A fuel-injection type carburetor for internal combustion engines, comprising a fuel-injection nozzle having an orifice opening directly within the carburetor housing air flow passage, a valve means including a valve arranged exteriorly of said orifice and free to reciprocate relative thereto for opening and closing same, a fuel supply means for pumping a liquid fuel through said nozzle to said orifice at a pulsating pressure, a valve spring means, said valve being continuously free to move towards said orifice under the action of said spring means, and the tension in said spring means being sufficient to so move said valve towards said orifice in correspondence to the periodic depression of said pressure, said valve and said orifice being cooperatively configured whereby said valve effects an atomization of liquid flowing through said orifice pursuant to reciprocation of said valve caused by said pulsating pressure and by the action of said spring means, a sensing means in the air flow path of the carburetor adapted to sense variations in rate of air flow through the carburetor, the sensing means comprising a member movable in response to said air flow and arranged to yieldingly act upon said valve to urge same towards an open position relative to said orifice to a degree proportional to the rate of air flow through the carburetor whereby a means force urging said valve towards a closed position is determined by said spring means and said sensing means member acting in opposite senses upon said valve.

2. The carburetor of claim 1, said sensing means member comprising a flap displaceably mounted in the carburetor air flow path, a second spring means urging said flap in one direction and said flap being movable by dynamic air flow forces in a direction opposite to said one direction, said flap being connected to said valve through a one of said spring means which thereby constitutes a resilient link therebetween whereby movements of said flap in either reciprocal direction are yieldingly transmitted to said valve through a said one of said spring means.

3. The carburetor of claim 2, said sensing means comprising a lever pivoted about a common axis with said flap, said flap and lever being pivotable relative to each other about said common axis, said second spring means constituting a resilient link between said flap and said lever arranged to impart a yieldable pivoting force to said lever from said flap of a magnitude which varies in dependence upon the extent to which said flap pivots, a valve control member connected to said lever, said valve spring means acting upon said control member and urging same in a direction corresponding to the closed position of said valve, said second spring means urging said lever and control member in a direction corresponding to the open position of said valve whereby for each pivot position of the flap there results a mean force urging said control member towards said closed position, which mean force is the difference between the force exerted by said valve spring means and that exerted by said second spring means, said mean force being different for each pivot position of said flap.

4. The carburetor of claim 2, said valve spring means being arranged between said flap and said valve means, said second spring means being arranged between said flap and a fixed part of the carburetor whereby the tension in said second spring means is determined solely by the distance between said flap and said fixed part while the tension in said valve spring means is determined by movements of said flap and said valve means relative to each other.

5. The carburetor of claim 4, said valve spring means and said second spring means respectively urging said flap in opposite directions.

6. The carburetor of claim 5 including a sationary wall surrounding said flap and defining therewith an annular air intake passageway at a location upstream of said nozzle, said flap being reciprocably displaceable along the axis of said passageway, said wall having a varying outline along its axial extent whereby the area of said annular passageway varies in accordance with said flap being at different positions along the axial extent of said passageway.

7. The carburetor of claim 6, said valve spring means acting to urge said flap along said passageway axis in a first direction corresponding to a progressive enlarging of said area and said second spring means urging said flap oppositely to said valve spring means.

8. The carburetor of claim 2, said valve means comprising an axially reciprocable valve stem and said flap being axially reciprocable coaxially with said stem and relative thereto.

9. The carburetor of claim 8, said valve spring means and said second spring means comprising respective helical springs coaxially mounted relative to each other and relative to the said flap and to the axis of reciprocation of said valve.

10. The carburetor of claim 9, including spring adjustment means comprising a setting member axially displaceable along the axis of said flap and stem.

11. The carburetor of claim 10, including a stationary wall surrounding said flap, said wall and flap being cooperatively configured whereby an annular air flow passageway is defined therebetween of varying area which increases progressively in accordance with said flap being axially displaced further away from an axial position thereof at which said area is a minimum, said valve spring means acting to urge said flap away from said axial position thereof and said second spring means acting to urge said flap towards said position.

12. The carburetor of claim 11, said second spring means being compressible between a fixed part of said carburetor and said flap and said valve spring means being tensionable between a part rigid with said flap and a part of said stem.

13. The carburetor of claim 12, said setting member being arranged to vary the tension in said valve spring means.

14. The carburetor of claim 12, said setting member being arranged to vary the compression in said second spring means.

15. The carburetor of claim 11, said helical spring of said valve spring means having one end thereof attached to an end of said stem and the opposite end thereof attached to said setting member, said setting member being displaceably engaged on said flap whereby displacement of said setting member relative to said flap varies the tension in said helical spring of said valve spring means.

16. The carburetor of claim 12, wherein said orifice is directed in a direcion opposite to the air flow past said orifice and towards said flap which is upstream of said orifice, said carburetor defining an inlet path for air from exteriorly thereof and towards said passageway in a direction away from said orifice and thereafter from said passageway in a direction towards said orifice, said valve spring means being arranged to urge said flap in a direction away from said orifice.

17. The carburetor of claim 8, including a fixed sleeve, said flap being slidably mounted along the external surface of said sleeve and said valve means being reciprocably mounted within the bore of said sleeve.

18. The carburetor of claim 17, said valve means including a rigid stem slidably mounted within said bore and having opposite ends thereof extending beyond respective opposite ends of said bushing.

19. The carburetor of claim 17, including a setting member for varying the tension in said valve spring means, said valve means including said valve stem, said valve spring means, and said setting member all being arranged in successive axial order with each other with said valve spring means comprising a helical spring having one end attached to said stem and the other end attached to said setting member, said setting member being adjustably engaged relative to said flap.

20. The carburetor of claim 8, including a guide means for said valve, said guide means being flexibly yieldable along the reciprocal axis of said valve and being self-aligning along said axis.

21. The carburetor of claim 20, said guide means comprising a plate member attached to said stem with said stem extending perpendicularly therethrough, a plurality of resiliently deformable members extending transversely to said axis along angularly displaced directions from said plate members to fixed points on the carburetor and being attached at opposite ends thereof to said plate member and to said fixed points.

22. The carburetor of claim 21, said resiliently deformable members being helical springs which are deformable in a direction transverse to said axis as well as along said axis.

23. The carburetor of claim 22, including three of said helical springs symmetrically arranged about said axis.

24. The carburetor of claim 20, said guide means including a plate member attached to said valve means and also being attached to respective fixed parts of the carburetor, said plate members being flexibly resiliently yieldable in accordance with said valve reciprocating along its axis.

25. The carburetor of claim 24, including a plurality of said plate members, each at an axially spaced apart location from the other along said stem.

26. The carburetor of claim 24, said plate member being a blade spring.

27. The carburetor of claim 20, said guide means comprising a plate having said stem extending perpendicularly relative thereto, a pair of wires attached at opposite ends thereof to said plate and to a part of said valve stem, said plate being attached to a fixed part of the carburetor, said wires being of rigid material but being resiliently flexible so as to bend in accordance with the reciprocations of said stem.

28. The carburetor of claim 26, said stem extending perpendicularly through said plate member.

29. The carburetor of claim 26, said plate member being attached at one end thereof to a fixed part of the carburetor and at another end thereof to said valve means.

30. The carburetor of claim 8, wherein said flap is in the form of a body of varying cross-sectional shape along the axis of reciprocation thereof, the carburetor including a fixed wall axially surrounding said body with an annular space therebetween whose configuration varies in accordance with said body being at different axial positions along its said axis of reciprocation.

31. The carburetor of claim 30, said wall and body being cooperatively configured and having respective facing surfaces define a streamlined axial path for air flowing axially through said annular space.

32. The carburetor of claim 1, including adjustment means for varying the tension on said valve spring means, said adjustment means being located so as to be accessible while the carburetor is in operation.

References Cited

UNITED STATES PATENTS

| | | |
|---|---|---|
| 1,029,606 | 6/1912 | Guthrie. |
| 1,049,318 | 12/1912 | Westway _____ 261—50.1 UX |
| 1,224,612 | 5/1917 | Davies. |
| 1,326,170 | 12/1919 | Bennett. |
| 1,435,947 | 11/1922 | Tracy et al. |
| 1,606,491 | 11/1926 | Abernethy et al. |
| 1,728,730 | 9/1929 | Gwisdalla _____ 261—50.1 UX |
| 1,752,161 | 3/1930 | Fairbanks et al. |
| 2,683,028 | 7/1954 | Schneebeli. |
| 2,714,501 | 8/1955 | Sellers. |
| 2,892,453 | 6/1959 | Stoll. |
| 1,206,359 | 11/1916 | Ohlsson _____ 239—453 |
| 1,606,491 | 11/1926 | Abernethy et al. ___ 261—50.1 X |
| 2,002,732 | 5/1935 | Culp _____ 261—51 |
| 2,194,540 | 3/1940 | Breeze _____ 261—49 |
| 3,033,182 | 5/1962 | Allen _____ 123—32 |
| 3,039,699 | 6/1962 | Allen _____ 239—102 X |
| 3,510,112 | 5/1970 | Winquist et al. _____ 261—37 |
| 1,591,331 | 7/1926 | Linebarger _____ 261—36 A |
| 3,258,254 | 6/1966 | Jakob _____ 261—36 A |

FOREIGN PATENTS

| | | |
|---|---|---|
| 84,114 | 2/1957 | Netherlands. |

TIM R. MILES, Primary Examiner

U.S. Cl. X.R.

123—32; 239—453